Figure 1:
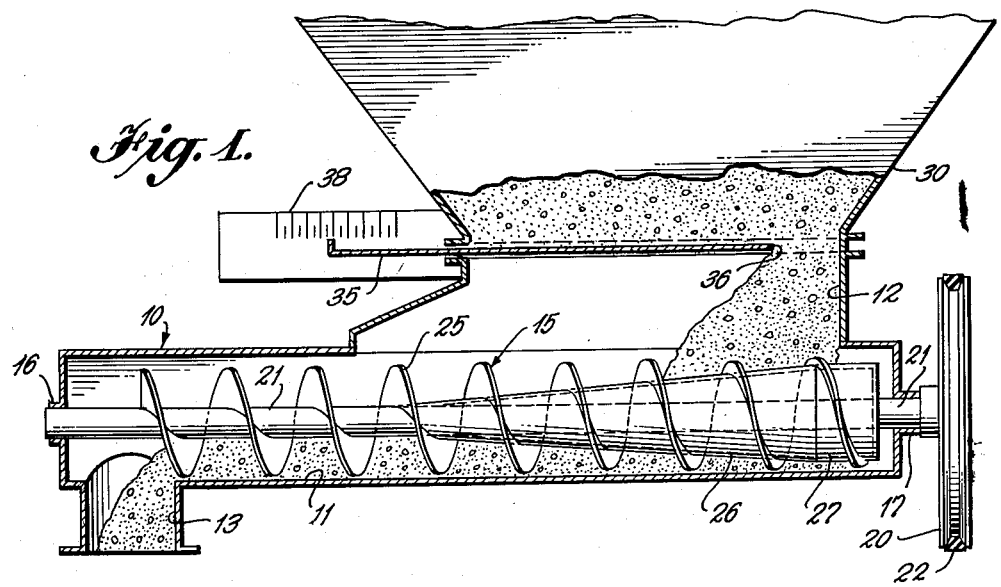

Dec. 24, 1963  C. E. JOHANNINGMEIER  3,115,276
SCREW CONVEYOR APPARATUS
Filed Jan. 23, 1961  4 Sheets-Sheet 1

INVENTOR
Charles E. Johanningmeier
BY Dale H. Hoscheit
ATTORNEY

Dec. 24, 1963  C. E. JOHANNINGMEIER  3,115,276
SCREW CONVEYOR APPARATUS
Filed Jan. 23, 1961  4 Sheets-Sheet 3

INVENTOR
Charles E. Johanningmeier
BY
Dale H. Hoscheit
ATTORNEY

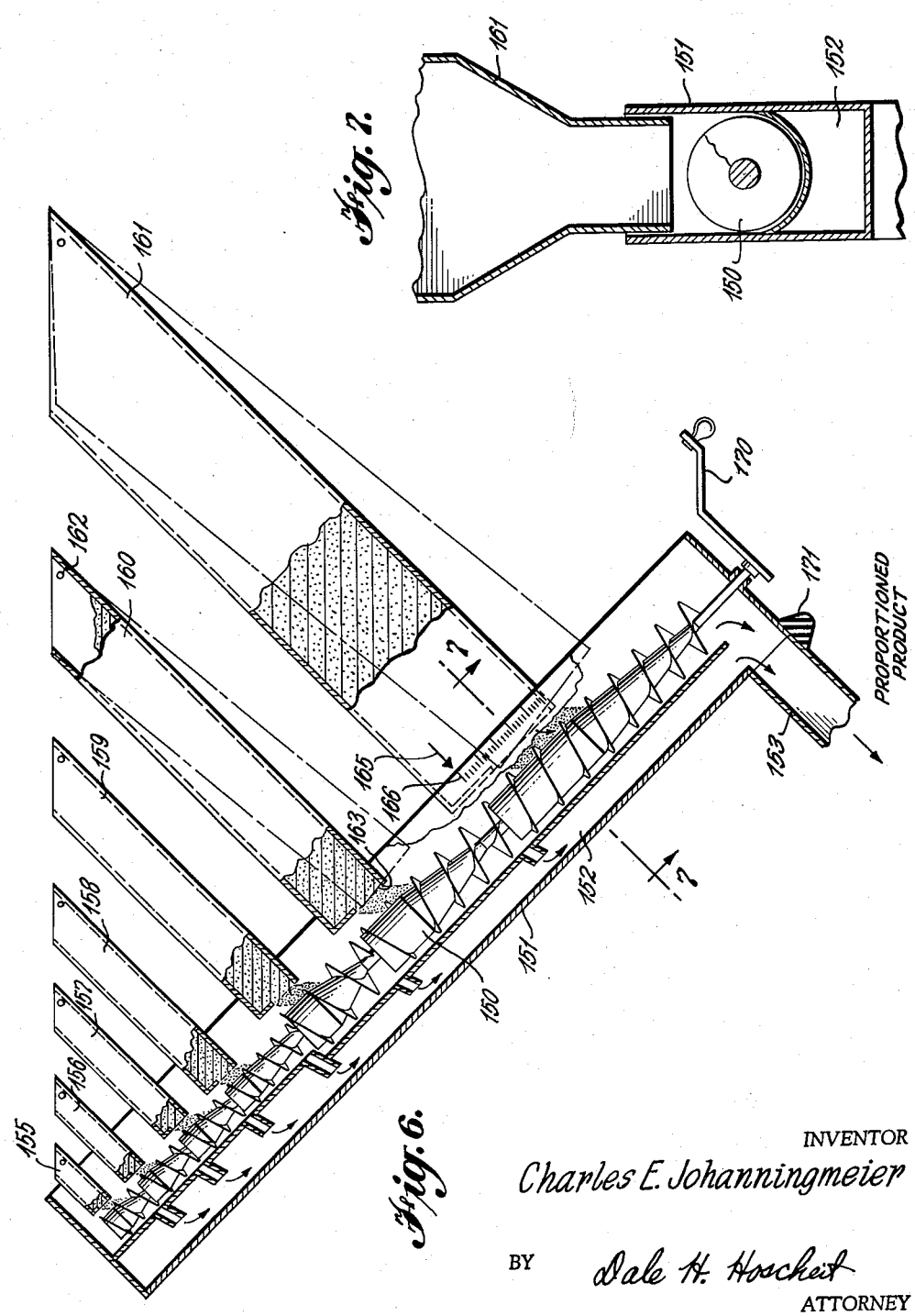

United States Patent Office 3,115,276
Patented Dec. 24, 1963

3,115,276
SCREW CONVEYOR APPARATUS
Charles E. Johanningmeier, Carlsbad, N. Mex., assignor to International Minerals & Chemical Corporation, a corporation of New York
Filed Jan. 23, 1961, Ser. No. 84,374
16 Claims. (Cl. 222—49)

This invention relates generally to the art of conveying particulate material. More particularly, the invention is directed to screw type conveyor apparatus wherein accurately variable control of the flow rate through the conveyor may be effected while the rotative speed of the conveyor screw remains constant.

The conventional screw conveyor embodies a housing having a screw rotatively mounted therein with the screw being formed with a core of generally uniform diameter throughout its length and a helical thread encircling the core. In this conventional screw conveyor various means are employed to adjust the rate of material conveyed by the conveyor. The speed of rotation of the conveyor screw can be varied as one approach to obtaining variation in the conveying rate. This of course requires providing a more expensive and usually complicated drive for the conveyor screw. As another approach, different valve mechanisms can be employed at the screw conveyor inlet to alter the rate at which the material is admitted to the conveyor screw. Generally, obtaining control of material flow by this approach with a conventional screw is not too effective. Further, with lumpy or sticky material the use of a conventional screw gives problems in jamming and breakage of the turns of the screw.

The use of variously modified conveyor screw constructions has been proposed but these have not found any real amount of use apparently due to deficiencies in the overall apparatus with which they were associated.

The instant invention has for its principal object the providing of an improved screw conveyor apparatus wherein variation of the conveying rate for a constant rotative speed may be achieved with quite accurate and uniform control of the desired flow rate.

A further object of the instant invention is to provide a screw conveyor apparatus wherein the likelihood of breakage of the thread turns on the conveyor screw as may be caused by jamming of large or sticky particles in the conveyed material is minimized.

It is also an object of this invention to provide a screw conveyor apparatus wherein the likelihood of jamming due to the presence of lumps and sticky particles in the material being conveyed is reduced.

A further object of the instant invention is to provide a screw type conveyor apparatus incorporating a screw having a tapered core with a helical thread of uniform exterior dimension encircling such core, together with a swing gate associated with the conveyor screw to obtain improved variable control of the material conveying rate for a particular rotative speed of the conveyor screw.

It is also an object of this invention to provide a screw conveyor apparatus in accordance with the above object wherein a plurality of screw segments each having a tapered core and helical thread encircling the core are provided with a gate means controlling the material inlet to each segment whereby materials of different character may be drawn from separate supply hoppers by the respective screw segments in desired proportions as determined by the degree of opening of the gate means for each segment.

The above and other objects and novel features of the instant invention will be apparent from the following description taken in connection with the accompanying drawings. It is to be expressly understood, however, that the drawings are for the purpose of illustration only and are not intended to define the limits of the invention but rather to merely illustrate embodiments and structures incorporating the features of the instant invention.

Figure 2:
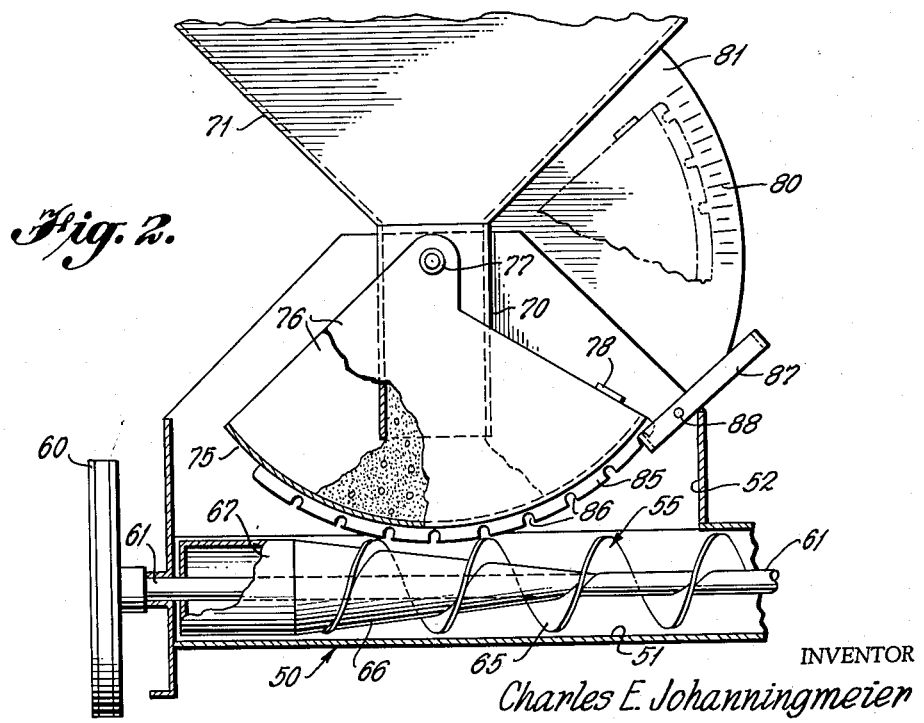
Figure 3:
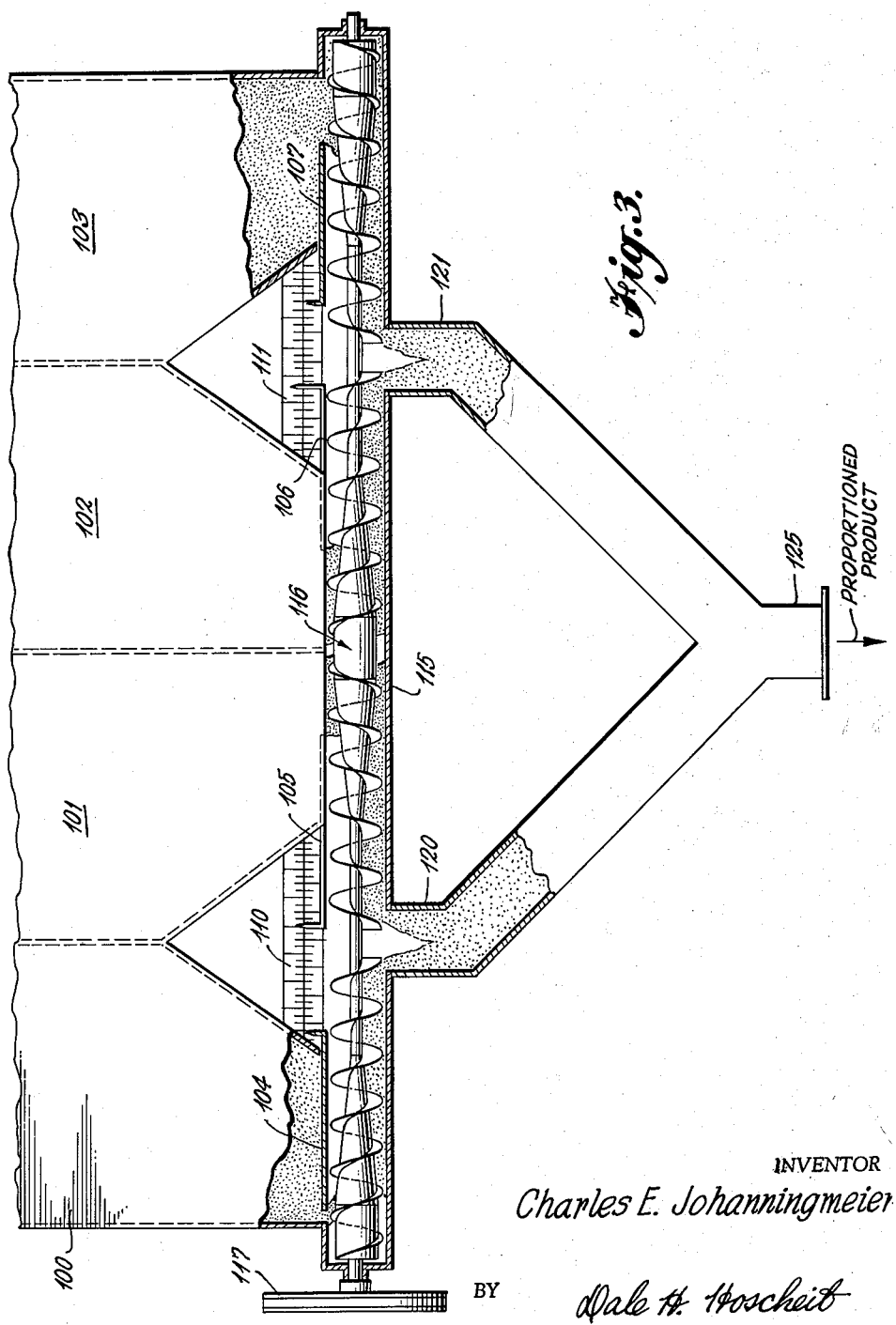
Figures 4, 5:
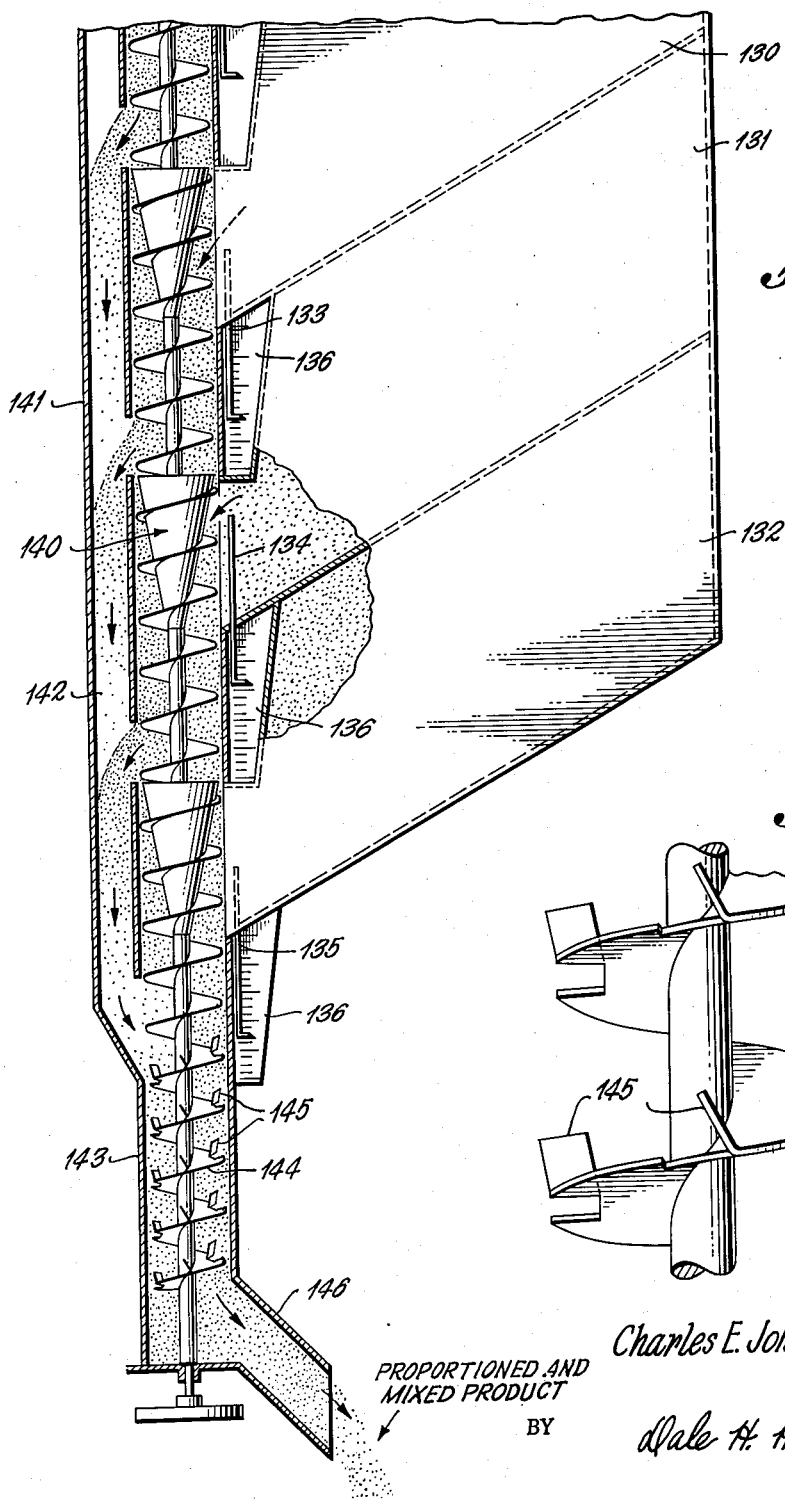

In the drawings wherein like reference characters refer to like parts throughout the several views:

FIGURE 1 is a cross sectional view showing one embodiment of a screw conveyor apparatus made in accordance with the instant invention, FIGURE 2 is a cross sectional view illustrating another embodiment of apparatus made in accordance with the instant invention, FIGURE 3 is a sectional view with parts in elevation showing one structure making practical application of the instant invention, FIGURE 4 is a sectional view showing another structure incorporating the screw conveyor of the instant invention, FIGURE 5 is a detail view in elevation showing a portion of the agitator incorporated in the structure of FIGURE 4, FIGURE 6 is a sectional view with parts shown in elevation illustrating a further practical application of the screw conveyor structure of this invention, and FIGURE 7 is a sectional view taken on line 7—7 of FIGURE 6.

Referring to the screw conveyor embodiment shown in FIGURE 1 the apparatus includes a housing 10 which defines an elongated cavity 11. An inlet passage 12 communicates with the cavity 11 in the upper portion thereof adjacent one end of the cavity. An outlet opening 13 communicates with the cavity 11 at the lower portion thereof adjacent the opposite end of the cavity.

A conveyor screw 15 is rotatably mounted within the cavity to dispose the axis thereof extending longitudinally of the cavity. The mounting of the screw 15 is illustrated as being effected by bearing 16 in one end wall of the housing 10 and bearing 17 in the opposite end wall of the housing. A suitable drive pulley 20 is secured to the outer end of the conveyor screw shaft 21. This pulley may be engaged by a belt 22 leading to a suitable drive means (not shown).

Turning to the construction of the conveyor screw 15, it will be noted that the shaft 21 forms the core for a portion of the length of the screw adjacent the outlet opening 13. A helical thread 25 encircles the core to define a uniform outer diameter for the screw 15. The core is provided with a tapered portion 26 which increases in diameter to a maximum diameter at the end 27 which is adjacent and as illustrated is immediately below the inlet passage 12.

The construction of the screw 15 as described hereinabove results in the radial depth of adjacent turns of the helical thread 25 increasing from the end 27 along the tapered portion 26 of the core until the depth of the turns reaches a maximum where the thread encircles the uniform diameter core portion formed by shaft 21. It will be appreciated that the particular form of screw 15 may be produced from a solid metal shaft wherein the tapered portion 26 of the core and the helical thread 25 formed along the length of the shaft. However, in the illustrated embodiment the tapered portion 26 and the end 27 are formed by being built up from sheet metal in the manner shown by the dotted line showing on FIGURE 1, and also illustrated at the broken away portion on FIGURE 2.

A hopper 30 is illustrated as extending upwardly from the inlet passage 12, to provide a suitable means for retaining a supply of particulate material which is to be withdrawn and conveyed by the screw conveyor. A gate 35 is slidably mounted in suitable guideways formed in the inlet passage 12. The leading edge 36 of this gate defines with the sides and end of inlet passage 12 a material inlet. As shown in FIGURE 1, the gate is partially open so that a limited quantity of the material in hopper 30 may flow to the shallow turns of the helical screw thread to be conveyed by rotation of the screw to the outlet opening 13.

The initial opening point for the material inlet must be disposed adjacent the shallow turns of the helical thread and as the inlet size is increased the inlet will move toward the deeper turns of the helical thread to a point where the inlet is fully open. With this relationship of the material inlet, the material is initially discharged onto the shallow turns where the smaller volume between turns results in a smaller material conveying rate. These shallow turns, because of their smaller radial depth, are particularly strong to resist breaking and therefore are highly effective in conveying material with hard particles therein. Also, these shallow strong turns are effective in breaking up lumps which might wedge between and jam or break the deeper turns on a conventional conveyor screw. The rate of conveying is readily changed by increasing the material inlet size in a direction that the material is exposed to the deeper thread turns where a greater volume of material can be handled between these deeper turns and conveyed by rotation of the screw.

A graduated scale 38 is mounted exteriorly of the throat of inlet passage 12 adjacent the outer end of the gate 35. This scale provides a ready indication of the degree of opening of the material inlet as reflected by the position of the end of gate 35 and thus may be relied upon to determine the rate of material being conveyed for a particular rotative speed of the conveyor screw.

The advantages of the screw conveyor apparatus as described hereinabove are many. With such apparatus any conventional constant speed drive may be connected to rotate the conveyor screw with the rate of material conveyance being readily variable by adjustment of the material inlet gate opening as is effected by sliding the gate 35 in or out and determining its position from the graduated scale 38.

Although, as illustrated in FIGURE 1, a single plate-like gate member has been shown, it will be appreciated that various other constructions may be employed to form the gate, all within the scope of the instant invention. One particularly advantageous approach in forming the gate is to substitute a series of separately movable strips or rods which extend tranversely to the axis of the conveyor screw and which collectively close the inlet passage to block flow from the hopper through the passage. In use, these separate strips or rods can be withdrawn in succession to obtain the desired material inlet size by the number of strips or rods withdrawn.

FIGURE 2 illustrates an embodiment of the instant invention which has certain advantages over the slide type gate described hereinabove with respect to FIGURE 1. Although the slide type gate either as a single plate-like member or as a series of strips or rods is advantageous in that it may be placed closely adjacent the exterior of the conveyor screw and requires a minimum of space above the conveyor screw and below the material supply hopper. The plate-like gate member 35 in the FIGURE 1 embodiment does encounter substantial frictonal resistance to opening and closing by reason of the weight of particulate material resting thereon and the difficulty of pinching off material flow through the inlet passage. This drawback may be overcome to an extent by substituting the separate strips or rods in the manner as described in the above paragraph.

In the embodiment of FIGURE 2, a swing gate is incorporated, its use having the definite advantage in that control of the rate of material flow to the conveyor screw may be more readily effected while the ease of movement of the gate is not seriously obstructed by the large weight of material which may be held up by the gate. In many aspects, the construction of the FIGURE 2 embodiment is closely similar to the construction described hereinabove with respect to the FIGURE 1 embodiment. Accordingly, a detailed restatement of the above description should not be necessary.

Specifically as shown in FIGURE 2, a housing 50 is provided having an elongated cavity 51 with an inlet passage 52 adjacent one end of the cavity and an outlet opening similar to the outlet opening 13 in FIGURE 1, formed adjacent the opposite end of the cavity. A conveyor screw 55 is rotatably mounted to dispose the longitudinal axis thereof extending longitudinally of the cavity. This screw has a drive pulley 60 mounted on the outer end of shaft 61 which may be suitably connected to a drive means (not shown) to effect rotation of the conveyor screw.

The screw 55 is similar to previously described screw 15 in that the core has a tapered portion 66 with its largest diameter at the end 67 and a helical thread 65 encircling the tapered portion 66 and the uniform diameter core portion which is formed by the shaft 61.

The inlet passage 52 has an inlet tube 70 mounted therein and communicating at its upper end with a suitable material supply hopper 71. The tube 70 extends downwardly and terminates above the conical portion 66 of conveyor screw 55. An arcuate gate 75 is mounted to be swingable below the end of tube 70. As illustrated, this gate has side elements 76 which extend upwardly on opposite sides of tube 70 and are pivotally connected at 77 to provide for swinging movement of the gate.

As illustrated, a suitable handle 78 may be secured to bridge the side elements 76 so that it may be engaged to drawing the gate to the desired open position. Graduated scale 80 is provided on a plate 81 mounted to be adjacent the path of swinging movement of gate 75. The fully open position for the gate is shown in phantom on FIGURE 2, illustrating how the scale 80 may be employed to determine the desired degree of opening for the gate and thus set the rate of material flow and rate at which it will be conveyed at the particular rotative speed of screw 55.

A suitable latching means for retaining the gate in the desired open position is provided by a flange 85 formed along the outer surface of the gate and having notches 86 which may be selectively engaged by the end of a latch 87 which is pivoted on the housing at 88. As shown in FIGURE 2, the latch 87 is engaged to retain the gate 75 in the fully closed position. It will be appreciated that by raising the outer end of latch 87 the gate 75 will be freed whereupon it can be pulled to the desired open position by means of handle 78 and then the latch 87 released to engage in the appropriate notch 86 and thereby retain the gate in this desired open position.

The advantages in operation of the conveyor screw 55 are similar to those outlined above with respect to the embodiment illustrated in FIGURE 1. Depending on the degree of swinging of the gate 75, the material inlet size may be varied as such inlet is defined between the edge of gate 75 and the lower end of tube 70. Upon initial admission of material to the screw 55, this material will engage the shallow turns of the helical thread where a lesser volume of material can be handled. As the gate is opened to provide a larger material inlet, more material will be admitted and in turn this material will be distributed to the deeper turns of the helical thread where a greater volume of material will be conveyed for a particular rotative speed of the screw.

Turning to FIGURE 3, one adaptation of the conveyor structure of the instant invention is shown. As illustrated, slide type gates such as described hereinabove with reference to FIGURE 1 are employed. It will, of course, be appreciated that with appropriate modification the swing type gate described in conjunction with FIGURE 2 may be adapted in place of the type of gate shown in FIGURE 3. A similar substitution may be made in the structures of FIGURE 4.

In FIGURE 3 a series of four material supply hoppers 100, 101, 102, and 103 are provided with a plate-like slide gate 104 defining a material inlet to the conveyor screw from hopper 100, a similar slide gate 105 operable to define the material inlet from hopper 101, a slide gate 106 adjustable to define the material inlet from hopper 102, and a slide gate 107 disposed to provide the material inlet to the conveyor screw from hopper 103. A graduated scale 110 is mounted between the hoppers 100 and 101 to be usable in giving an indication of the material inlet size as determined by the gates 104 and 105. A similar scale 111 is provided for the hoppers 102 and 103 such that the material inlet sizes from these two hoppers may be indicated by way of the position of the gates 106 and 107 relative to scale 111.

A housing 115 extending beneath the hoppers 100, 101, 102, and 103 provides an elongated cavity in which is mounted a conveyor screw 116. The conveyor screw has a suitable drive pulley 117 connected on the outer end thereof which may be coupled to a suitable drive means (not shown) for rotating screw 116.

The screw 116 is made up of a series of segments each of which has a helical screw thread encircling a core. Each core has a tapered portion so that the radiant depth of adjacent turns of the thread will increase along the length of this tapered portion. It will be appreciated that each of these screw segments is generally comparable to the conveyor screw construction 15 and 55 as described hereinabove with respect to FIGURES 1 and 2 respectively. The housing 115 has an outlet opening 120 which receives the material conveyed from two of the screw segments and has an outlet opening 121 which receives the material conveyed from the other two segments. These two outlets are combined in a single discharge duct 125 which, as noted, will carry away the proportioned product made up of the portions of the materials withdrawn from the respective hoppers 100 through 103.

It may be noted that the screw segments of each pair that feed to a common outlet opening are oppositely threaded so that for a particular direction of rotation of the screw 116 the material will be appropriately conveyed from the hopper above the shallow turns of the screw segment to the proper outlet opening.

The operation of the proportioning apparatus of FIGURE 3 will be readily appreciated from the description given hereinabove with respect to the embodiments of FIGURES 1 and 2. In the structure of FIGURE 3, the individual gates 104, 105, 106, and 107 can be adjusted as indicated on the graduated scales 110 and 111 so that for a particular rotative speed of the conveyor screw desired portions of the material will be withdrawn from the hoppers 100, 101, 102 and 103. By adjusting any one or more of the slide gates, the portion of material admitted to the screw segment beneath the gate may be altered, thereby changing the relative proportions of the materials in the final product flowing through duct 125.

In FIGURE 4 a proportioning apparatus somewhat similar to the adaptation in FIGURE 3 is shown. In this embodiment, three material supply bins 130, 131, and 132 are shown. The outlet of each bin is controlled by a slide gate, i.e. gate 133 for bin 130, gate 134 for bin 131, and gate 135 for bin 132. Each gate has a graduated scale 136 mounted adjacent the end of the gate to indicate the material inlet size for the particular setting of the gate and thereby indicate the rate of material admitted to the conveyor screw.

The conveyor screw 140 is rotatably mounted in a vertical position contained within the elongated cavity of the housing 141 which extends up along the three bins. The screw 140 has segments each including a core with a tapered portion and a helical screw thread of uniform exterior diameter encircling the core.

The material withdrawn from each bin, dependent upon the degree of opening of the material inlet, is fed by the screw segment associated with the bin into a common passage 142 and thence down to an agitator section 143. The agitator section is formed as a continuation of the conveyor screw 140 and includes a helical thread 144 formed with bent-up tabs 145 as shown in greater detail in FIGURE 5. The proportioned and mixed product is discharged from the bottom of the housing 141 beneath the agitator section 143 through an outlet 146.

In FIGURE 6 another proportioning apparatus constituting a practical adaptation of the instant invention is shown. In this embodiment a conveyor screw 150 constructed similarly to conveyor screw 140 as shown in FIGURE 4 is provided. This screw is rotatably mounted in a housing 151 which has a common passage 152 for collecting and mixing the materials which are drawn from the respective bins 155, 156, 157, 158, 159, 160, and 161. The passage 152 exits in an outlet duct 153 through which the proportioned product is withdrawn. FIGURE 7 illustrates the manner in which housing 151 is formed to provide passage 152 and the cavity for the conveyor screw 150.

Each of the bins 155 through 161 is pivotally mounted such as shown at 162 and is provided with a material inlet 163 to discharge material from the bin onto one of the screw segments adjacent the inlet 163 for the particular bin. The pivotal mounting of the bin enables each bin to be moved in an arc such that the material inlet 163 may be positioned in the desired relation to the shallow or deeper turns on the screw segment. As will be appreciated from the description above, the material withdrawn from each bin will be dependent upon the volume of material handled by the adjacent turns of the screw which are disposed opposite inlet 163. Thus, when the inlet 163 of a particular bin is moved to overlie the deeper turns of the adjacent screw segment a greater volume of material will be withdrawn from that bin.

As shown with respect to bin 161 a pointer 165 may be provided on the side of the bin and a graduated scale 166 formed on the immediately adjacent side wall of housing 151. Thus, as the bin is pivoted the position of the material inlet 162 to the shallow or deep screw turns of the associated screw segment and therefore the rate at which material will be withdrawn from that bin may be indicated by the relation of pointer 165 to scale 166.

In the embodiment shown in FIGURE 6 a manually engageable handle 170 is connected to the outer end of the conveyor screw 150. A proportioned product of the material in bins 155 through 161 may be obtained by turning the handle 170 the appropriate number of turns for the desired quantity of proportioned product. A bumper 171 is mounted on housing 151 in a position to be engaged by handle 170 as it is turned. This bumper is effective upon turning the handle 170 to jar the housing 151 and thereby promote flow of the various materials and their mixing into the final proportioned product.

While certain present preferred embodiments of the invention and adaptations thereof have been shown and described, it is to be distinctly understood that the invention is not limited thereto but may be otherwise variously embodied and practiced within the scope of the following claims.

I claim:

1. Apparatus for conveying particulate material comprising a housing defining an elongated cavity, said housing having an inlet passage communicating with said cavity and an outlet opening longitudinally spaced along said cavity from said inlet passage and communicating with said cavity, a conveyor screw mounted within said cavity to be rotatable about an axis extending longitudinally of said cavity, said screw having a substantially uniform outer diameter defined by a helical screw thread encircling a core, said core having a tapered portion encircled by said thread with the radial depth of adjacent turns of said thread increasing along the tapered portion of said core, said screw having the larger diameter of the tapered core portion disposed adjacent said inlet passage with the housing enclosing said screw between said inlet passage and said outlet opening, a gate for controlling material flow to said screw and mounted in said inlet passage to be movable from a first position whereat it closes said passage to a second position whereat a material inlet is formed adjacent said conveyor screw to accommodate flow of material to the conveyor screw, said mounting of said gate providing for movement of said gate from said first to said second position commencing at an initial point disposed adjacent the shallow turns of said helical thread and continuing toward the deeper turns of said helical thread whereat said material inlet is fully open, said gate preventing access of particulate material to said screw turns other than the turns immediately adjacent the extent of openings of the material inlet whereby the rate of material conveying by said apparatus will be determined by the extent of opening of said material inlet for any rotative speed of said conveyor screw.

2. Apparatus as recited in claim 1 wherein said gate comprises a plate-like member slidable in guideways formed in said inlet passage to move in a plane generally parallel to the axis of rotation of said screw.

3. Apparatus as recited in claim 2 wherein a graduated scale is mounted exteriorly of said inlet passage and adjacent the outer end of said plate-like member to provide an indication of the extent of opening of said material inlet as effected by withdrawing said member.

4. Apparatus as recited in claim 1 wherein said gate comprises a gate member swingably mounted about an axis lying in a plane which is normal to the axis of rotation of said screw to be movable in an arc across said inlet passage.

5. Apparatus as recited in claim 4 wherein a graduated scale is mounted exteriorly of said inlet passage and adjacent the outer end of said member to provide an indication of the extent of opening of material inlet as effected by swinging said gate member about its mounting axis.

6. Apparatus for conveying particulate material comprising a housing defining an elongated cavity, said housing having an inlet passage communicating with said cavity and an outlet opening longitudinally spaced along said cavity from said inlet passage and communicating with said cavity, said inlet passage including an inlet tube for conducting material through said passage, a conveyor screw mounted within said cavity to be rotatable about an axis extending longitudinally of said cavity, said screw having a substantially uniform outer diameter defined by a helical screw thread encircling a core, said core having a tapered portion encircled by said thread with the radial depth of adjacent turns of said thread increasing along the tapered portion of said core, said inlet tube being mounted to direct material onto the shallower turns of said screw thread, an arcuate gate swingably mounted to pivot about an axis lying in a plane normal to the axis of said screw, and be movable from a first position where it blocks said inlet tube to a second position whereat a material inlet is formed between the edge of said gate and the end of said inlet tube to accommodate flow of material to the conveyor screw, said arcuate gate being mounted to provide a concave upwardly facing material blocking surface spaced beneath said inlet tube in said first position, movement of said gate from said first to said second position effecting forming of said material inlet commencing at an initial point disposed adjacent the shallow turns of said helical thread and continuing toward the deeper turns of said helical thread whereat said material inlet is fully open.

7. Apparatus as recited in claim 6 wherein said gate is swingably mounted on said inlet tube and has an arcuate portion with side elements extending on opposite sides of said inlet tube with said side elements pivotally connected to said inlet tube.

8. Apparatus as recited in claim 6 wherein latching means are provided to selectively retain said gate in selected positions for different rates of material flow to said conveyor screw.

9. Apparatus as recited in claim 6 wherein a graduated scale is mounted adjacent said arcuate gate to provide an indication of the degree of opening of said material inlet as effected by swinging said gate about its mounting axis.

10. Apparatus for conveying particulate material comprising a housing defining an elongated cavity, said housing having inlet passages communicating with said cavity and at least one outlet opening longitudinally spaced along said cavity from said inlet passages and communicating with said cavity, a conveyor screw mounted within said cavity to be rotatable about an axis extending longitudinally of said cavity, said screw having a substantially uniform outer diameter defined by segments each made up of a helical screw thread encircling a core, said screw having one of said segments for each of said inlet passages with each segment having a tapered core portion encircled by a helical thread such that the radial depth of adjacent turns of said thread increase along the tapered portion of said core in each segment, a gate for controlling material flow to said screw and mounted in each of said inlet passages to be movable from a first position whereat it closes the respective passage to a second position whereat a material inlet is formed adjacent said conveyor screw to accommodate flow of material to the conveyor screw, said mounting of said gate providing for movement of said gate in each inlet passage from said first to said second position commencing at an initial point disposed adjacent the shallow turns of the screw segment associated with such passage and continuing toward the deeper turns whereat said material inlet for such passage is fully open.

11. Apparatus as recited in claim 10 wherein a single outlet opening in said housing accommodates the conveyed material from two screw segments to mix the materials conveyed from two oppositely threaded screw segments.

12. Apparatus as recited in claim 10 wherein said gate is slidably mounted in each inlet passage and a graduated scale provided adjacent each gate to offer an indication of the degree of opening of said material inlet as effected by sliding the gate in the respective inlet passage.

13. Apparatus as recited in claim 10 wherein a separate outlet opening is provided for each inlet passage.

14. Apparatus as recited in claim 10 wherein said conveyor screw rotation axis is vertical and an agitator section is mounted on the conveyor screw to receive and mix the materials conveyed and discharged together from the screw segments.

15. Apparatus for conveying particulate material comprising a housing defining an elongated cavity, said housing an elongated cavity, said housing having inlet passages communicating with said cavity and outlet openings longitudinally spaced along said cavity from said inlet passages and communicating with said cavity, a conveyor screw mounted within said cavity to be rotatable about an axis extending longitudinally of said cavity, said screw having a substantially uniform outer diameter defined by segments each made up of a helical screw thread encircling a core, said screw having one of said segments for each of said inlet passages with each segment having a tapered core portion encircled by a helical thread such that the radial depth of adjacent turns of said thread increase along the tapered portion of said core in each segment, each of said inlet passages including a hopper for material providing a material inlet for discharge of material to the conveyor screw, each hopper being pivotally mounted such that adjustment of the positon of the material inlet therein relative to its associated screw segment may be made to vary the rate of material conveying by such screw segment for any set rotative speed of said conveyor screw.

16. Apparatus as recited in claim 15 wherein means are provided operative on rotation of said conveyor screw to effect jarring of said housing to promote flow of the materials being conveyed and mixed.

References Cited in the file of this patent

UNITED STATES PATENTS

| | | |
|---|---|---|
| 179,149 | Barnes | June 27, 1816 |
| 465,473 | Gray | Dec. 22, 1891 |
| 954,850 | Burke et al. | Apr. 12, 1910 |
| 1,122,619 | Maas | Dec. 29, 1914 |
| 1,327,455 | Willis et al. | Jan. 6, 1920 |
| 1,566,808 | Baker | Dec. 22, 1925 |
| 1,695,692 | Kreisinger | Dec. 18, 1928 |
| 1,746,410 | Tolman | Feb. 11, 1930 |
| 2,056,239 | Walter | Oct. 6, 1936 |

UNITED STATES PATENT OFFICE
CERTIFICATE OF CORRECTION

Patent No. 3,115,276            December 24, 1963

Charles E. Johanningmeier

It is hereby certified that error appears in the above numbered patent requiring correction and that the said Letters Patent should read as corrected below.

Column 8, lines 53 and 54, strike out "said housing an elongated cavity,".

Signed and sealed this 16th day of June 1964.

(SEAL)
Attest:

ERNEST W. SWIDER            EDWARD J. BRENNER
Attesting Officer            Commissioner of Patents